United States Patent [19]
Henderson

[11] Patent Number: 4,811,616
[45] Date of Patent: Mar. 14, 1989

[54] SYSTEM FOR COMBINING DRIVEN MODULES WITH DRIVING MODULES

[75] Inventor: William R. Henderson, Guilford, Conn.

[73] Assignee: Emerson Electric Co., St. Louis, Mo.

[21] Appl. No.: 41,940

[22] Filed: Apr. 24, 1987

[51] Int. Cl.$^4$ ............................................. F16H 1/06
[52] U.S. Cl. .................................. 74/421 A; 403/260
[58] Field of Search .............. 403/258, 259, 260, 334; 74/421 A, 640

[56] References Cited

U.S. PATENT DOCUMENTS

| | | | |
|---|---|---|---|
| 2,874,985 | 2/1959 | March | 403/334 X |
| 3,241,397 | 3/1966 | Wilkinson | 74/421 A X |
| 3,434,366 | 3/1969 | Raso et al. | 403/260 X |
| 3,739,652 | 6/1973 | Caldwell et al. | 74/421 A |
| 4,111,069 | 9/1978 | Blair et al. | 74/421 A X |
| 4,276,783 | 7/1981 | Anderson | 403/260 X |
| 4,337,406 | 6/1982 | Binder | 403/260 X |
| 4,641,992 | 2/1987 | Patroni | 403/260 X |

FOREIGN PATENT DOCUMENTS 562138  6/1944  United Kingdom ................ 403/258

*Primary Examiner*—Dwight G. Diehl
*Attorney, Agent, or Firm*—Polster, Polster and Lucchesi

[57] ABSTRACT

A system of combining any one of a plurality of driving modules (e.g., electric motors) with any one of a plurality of driven modules (e.g., speed reducers) is disclosed. Each of the driving modules has an output shaft and each of the driven modules has an input shaft. One of these shafts of the combined driving module and driven module combination has a tapered outer surface, and the other of these shafts has a tapered socket therein, with the tapered outer shaft being coaxially received within the tapered socket, and with the taper of the outer surface and the taper of the socket being substantially the same. A draw screw is provided for locking the shafts in coaxial coupled relation. Driving modules are directly connected to driven modules through frame mating surfaces and the aforementioned tapered shaft/socket connection. When the driven module is assigned a mechanical service factor of 1.0 or greater, an adapter is interposed between the driving and driven modules. The adapter provides a connection between a given driving module frame to the frame of a driven module of greater horsepower capacity, while simultaneously locating the tapered socket of the driving module shaft to simultaneously coaxially receive the tapered shaft of the driven module at a predetermined axial position.

5 Claims, 5 Drawing Sheets

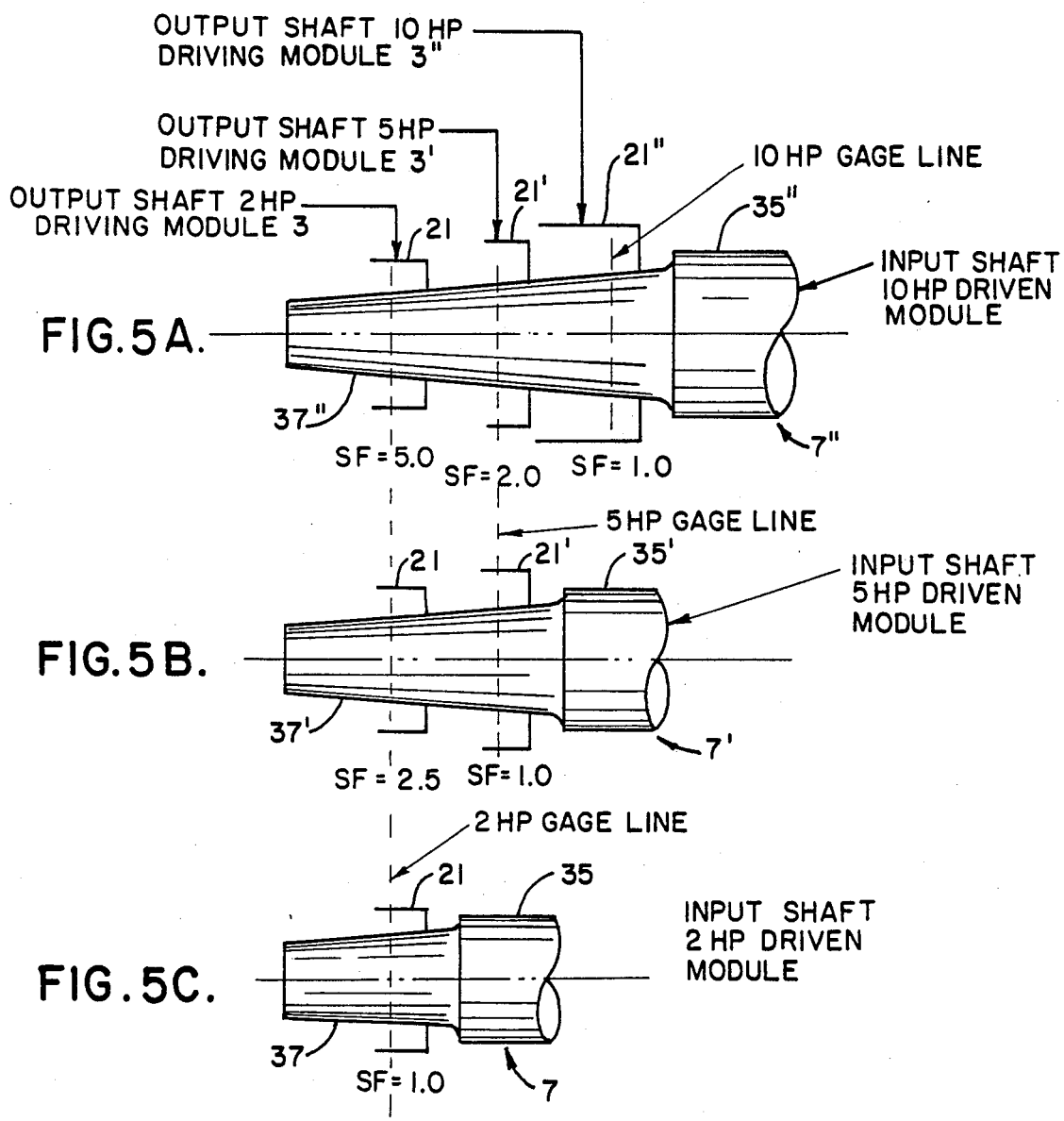

SYSTEM FOR COMBINING DRIVEN MODULES WITH DRIVING MODULES

BACKGROUND OF THE INVENTION

This invention relates to a system of combining any one of a plurality of driving modules (e.g., electric motors, intermediate speed changers, or the like) with any one of a plurality of driven modules (e.g., a speed reducer or an end application).

It will be understood that in the mechanical power transmission field, manufacturers of power transmission units manufacture and stock a wide variety of completely assembled units. Different drivers (or driving units, i.e., the motors) may be combined with any number of combinations of variable speed transmissions and/or gear reducers such that the overall or assembled unit meets the particular requirements specified by the end user. For example, a manufacturer may have a variety of different types of drivers (electric motors), in a wide range of horsepower ratings. Types of motors may include open drip-proof motors, totally enclosed fan cooled motors, explosion-proof motors, motors made of special corrosion-proof materials, and the like. Likewise, there may be a wide variety of variable speed transmissions and gear reduction units (referred to generally as driven units) powered by these electric motors. For example, a variable speed belt drive may be coupled with a particular motor. Alternatively, the motor may be coupled to a right angle worm gear reducer, a parallel shaft gear reducer, an eddy current drive, a vertical parallel shaft gear reducer, a variable speed traction drive, a helical shaft mount reducer, a worm-/helical gear reducer, a bevel/helical gear reducer, and the like. These driven units are provided in a range of horsepower ratings and mechanical service factors compatible with the motor selected. Many times, it is not uncommon for one driving unit (an electric motor) to be coupled with a first driven unit (e.g., a variable speed belt drive), with the latter having an output shaft which in turn is coupled to still another driven unit. For example, a totally enclosed fan cooled motor may be coupled to a variable speed belt drive unit, which in turn is coupled to a helical gear shaft mount reducer which in turn drives an application. In this manner, the final output speed of the helical gear shaft mount reducer may be infinitely adjusted by adjusting the variable belt drive speed reducer, and yet obtaining the desired torque and horsepower output.

The necessity to provide completely assembled power transmission units (e.g., a motor/drive/gear unit) in a wide variety of horsepower ratings a; and output speeds and service factors has, heretofore, required that large finished goods inventories be carried in stock such that, upon receiving an order, a complete unit comprised of the motor, speed changer, and/or gear reducer of the proper type and horsepower and output speed be readily available to fill the order. While it has long been recognized as an expensive requirement to maintain this large inventory of completely assembled units in stock, it has been considered a necessity so that the manufacturer can rapidly respond to orders from customers without the necessity of having to delay filling the order while one or more of the components are manufactured.

Reference may be made to the now expired, co-assigned U.S. Pat. No. 3,434,366, disclosing a modular drive and gear reduction unit.

At the present time, a different motor end is required for each type and size of integral gearmotor, mechanical variable speed drive, eddy current clutch, and other driven units. For example, in a right angle worm gearmotor product line, there may be seven different horsepower ratings of the gearmotor, with each of these seven different horsepower gearmotors being available in any one of 10 different speed ratios. This necessitates the number of right angle worm gearmotors stocked to be equal to seventy. To be able to fill an order in short order (i.e., two working days or less), it is necessary that all seventy of these different gearmotors be carried in stock.

There has been a long-standing need for a construction of driving modules and driven modules which allows a meaningful reduction in the amount of finished goods that must be carried in stock to economically permit a manufacturer to rapidly fill orders (i.e., within two working days).

SUMMARY OF THE INVENTION

Among the several objects and features of the present invention may be noted the provision of a system of combining any one of a plurality of driving modules with any one of a plurality of driven modules so as to readily permit the make-up of any on of a wide variety of combination driving modules and driven modules.

The provision of such a system which enables complete units to be readily assembled from stocked motor modules, variable speed transmission modules, and gear reducer modules while maintaining a much reduced inventory. For example, any of the aforementioned seventy different gearmotors can be readily supplied by combining one of seven different motor modules with one of ten different gear modules, thus reducing the stocking requirement from seventy to seventeen.

The provision of such a system which allows short delivery time of any comb:,nation of driven module and driving module without maintaining excessive finished goods in inventory.

The provision of such a system which requires little, if any, mechanical adaptation between driving modules and driven modules.

The provision of such a system which represents significant cost savings and which may be extended to a wide variety of drive products.

Other objects and features of this invention will be in part apparent and in part pointed out hereinafter.

Briefly stated, a system of the present invention permits the combining of any one of a plurality of driving modules with any one of a plurality of driven modules. Each of the driving modules has an output shaft, and each of the driven units has an input shaft. One of the shafts of the combined driving module and driven module has a tapered outer surface, and the other of these shafts has a tapered socket therein, with the tapered outer shaft being coaxially received within the tapered socket with the taper of the outer surface and the taper of the socket being substantially the same. Means are provided for locking the shafts in coaxial coupled relation. The driving and driven modules each have a respective frame, and the frames have respective mating surfaces. Means are provided for securing the frames together, with the output and input shafts in coaxial alignment. The driving module and the driven module having a horsepower rating with the horsepower rating of the driven module being greater than or equal to the horsepower rating of the driving module and with the ratio of the driven module horsepower rating to the driving module horsepower rating being referred to as a service factor. The input shaft of the driven unit is sized so as to be coupled to a driving unit having a service factor greater than or equal to 1. An adapter is provided between the driving module and the driven module when the service factor is greater than 1 with the adapter interposed between the mating surfaces of the driving module and the driven module so as to positively space the driven and driving module apart from one another a predetermined distance, with the tapered socket coaxially receiving the tapered shaft at an axial position therealong such that the socket firmly engages the tapered shaft therewithin.

BRIEF DESCRIPTION OF THE DRAWINGS

FIG. 5A diagrammatically shows the input shaft of a first, second, and third size (i.e., 10, 5, or 2 horsepower rating) of a driving module having tapered output shafts being received on the tapered input shaft of a first size (10 horsepower rating) driven module having service factors of 1.0, 2.0, and 5.0 therebetween;

FIG. 5B shows the input shaft of a second or third size driving module (i.e., 5 or 2 horsepower rating) being received on a second input shaft of a second driven module of a specified horsepower rating (e.g., 5 horsepower), having service factors of 1.0 and 2.5; and FIG. 5C shows the input shaft of a third size driving module (i.e., a 2 horsepower rating) being received on a third input shaft of a third driven module of a specified horsepower rating (e.g., 2 horsepower), having a service factor of 1.0.

Corresponding reference characters indicate corresponding parts throughout the several views of the drawings.

DESCRIPTION OF A PREFERRED EMBODIMENT

Figure 1:
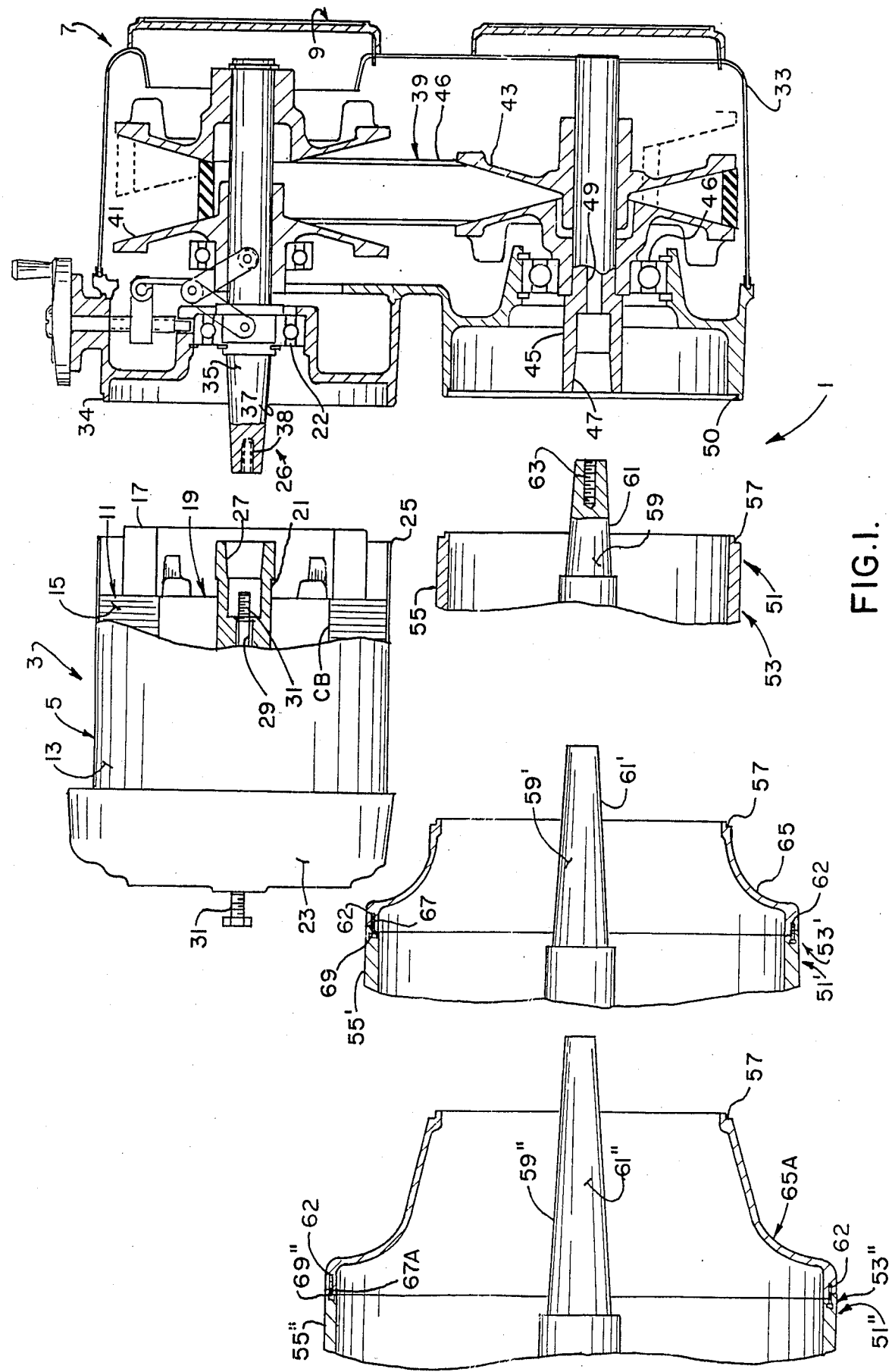
FIG. 1 is a side elevational view of a drive unit comprising a power module (e.g., an electric motor) coupled to a driven module (a variable speed belt drive speed reducer), with the output of this first driven module constituting another driving module which in turn is coupled to another driven module (a speed reducer or the like) in accordance with this invention.
Figure 2:
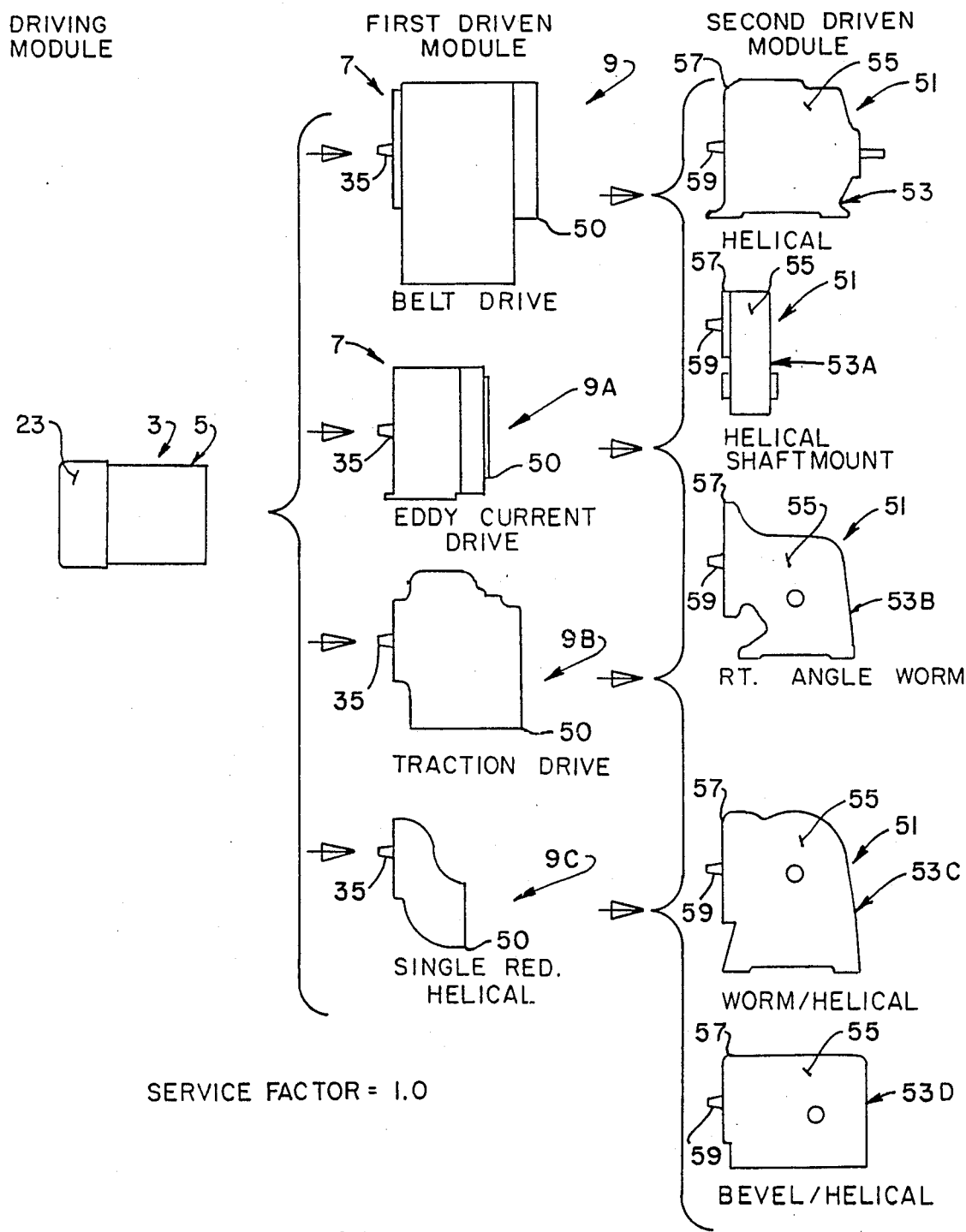
FIG. 2 is a diagrammatic view showing how various driving modules and various driven modules may be coupled together where factor therebetween is 1.0.

Referring now to the drawings, and more particularly to FIG. 1, a system of the present invention, as indicated in its entirety by reference character 1 is illustrated for combining any one of a plurality of driving modules 3, such as a suitable prime mover electric motor 5, with any one of a plurality of driven modules 7. Such driven modules may include a belt driven variable speed speed reducer, as indicated at 9 in FIG. 1. However, in accordance with the broader aspects of this invention, other driven modules, such as eddy current drives 9A, traction drives 9B, or single reduction helical drives 9C, as shown in FIG. 2, may be utilized.

Referring now to FIG. 1, electric motor 5 is shown to comprise a stator, as generally indicated at 11, enclosed within a generally cylindric shell or frame 13. The stator includes a core 15 comprising a stack of laminations of suitable ferromagnetic material having a central bore CB therethrough and a plurality of slots extending radially outwardly from the central bore. The radial slots receive the windings 17 of the motor, and a rotor 19 is received within the central bore of core 15. The rotor includes a rotor or output shaft 21 which is supported by a suitable bearing (not shown) in the rear endshield and by the input bearing 22 of driven module 7.

More specifically, motor 5 is shown to be a totally enclosed fan cooled motor. This motor has a fan shield 23 on one end thereof enclosing a fan (not shown) driven by one end of rotor shaft 21 so as to move cooling air over the outer surface of the totally enclosed shell housing 13 for cooling the motor. The outer or free end of the motor has a mating surface 25. The outer end (righthand end, as shown in FIG. 1) of rotor shaft 21 has a tapered socket 27 therein. The rotor shaft further has an axial bore 29 extending therethrough for receiving a draw screw 31 for purposes as will appear.

As heretofore noted, the first driven module 7, as illustrated in FIG. 1, is a variable speed belt drive speed reducer 9. This belt drive speed reducer includes a belt case or frame 33 having a mating surface 34 which is engageable with mating surface 25 of motor 5 when the motor is coupled with the driven module. Speed changer 9 includes a power input shaft 35 having a tapered outer surface 37 of substantially the same taper (e.g., 3.575 degrees relative to its longitudinal centerline) as tapered socket 27 in output shaft 21 of motor 5. Further, a threaded blind opening 38 is provided in the outer end of power input shaft 35 for threadably receiving the end of draw screw 31. Thus, with mating surface 25 of motor 5 engaging mating surface 34 of driven module 7, the tapered shaft 35 of the driven module is received within tapered socket 27 of motor output shaft 21 and, upon threadably inserting draw screw 31 through bore 29 and into threaded opening 38, the motor may be positively drawn into desired fixed relation with belt case 33 and the tapered input shaft 35 may be positively secured to the tapered socket 27 such that power may be readily transmitted from the output shaft of motor 5 to the power input shaft 35 of driven module 7.

Variable speed belt speed reducer 9 has a variable speed belt drive train 39 which includes an input sheave 41 carried by and rotatable with power input shaft 35. This shaft is journaled within belt case 33. Spaced apart from input shaft 35, another sheave, as indicated at 43, is securely mounted on a power output shaft 45 which is also journaled within belt case 33. The sheaves are interconnected by means of a flexible belt 46 such that the driven sheave 43 is driven by sheave 41. As is conventional with variable speed belt speed reducers, one half of the driven sheave 41 is movable axially toward and away from the other half of sheave 41 and, likewise, one portion of the driven sheave 43 is movable axially toward and away from the other portion of sheave 43, as indicated by the dotted lines in FIG. 1, by a suitable speed control mechanism. In this manner, it will be understood that the effective diameters of sheaves 41 and 43 engaging belt 46 may be varied so as to change the overall speed reduction factor of speed changer 9. It will be understood that the particular construction of the variable speed belt drive 9 does not, per se, constitute a part of this invention, and thus a detailed description of its construction will not be herein provided.

However, in accordance with this invention, speed changer 9 includes a power output shaft 45 which is driven by the lower adjustable sheave 43. Output shaft 45 is journaled in suitable bearings 46 carried by belt case 33. A tapered socket 47, substantially similar to tapered socket 27 in the output or rotor shaft 21 of motor 5, is provided in the outer end of output shaft 45 for the speed changer. As in shaft 21, an axial bore 49 extends lengthwise through shaft 45 for receiving a draw screw (not shown) similar to draw screw 31 here described in regard to the connection of output shaft 21 to input shaft 35. A portion of belt case 33 surrounding output shaft 45 provides a mating surface, as indicated at 50, for purposes as will appear.

Figure 3:
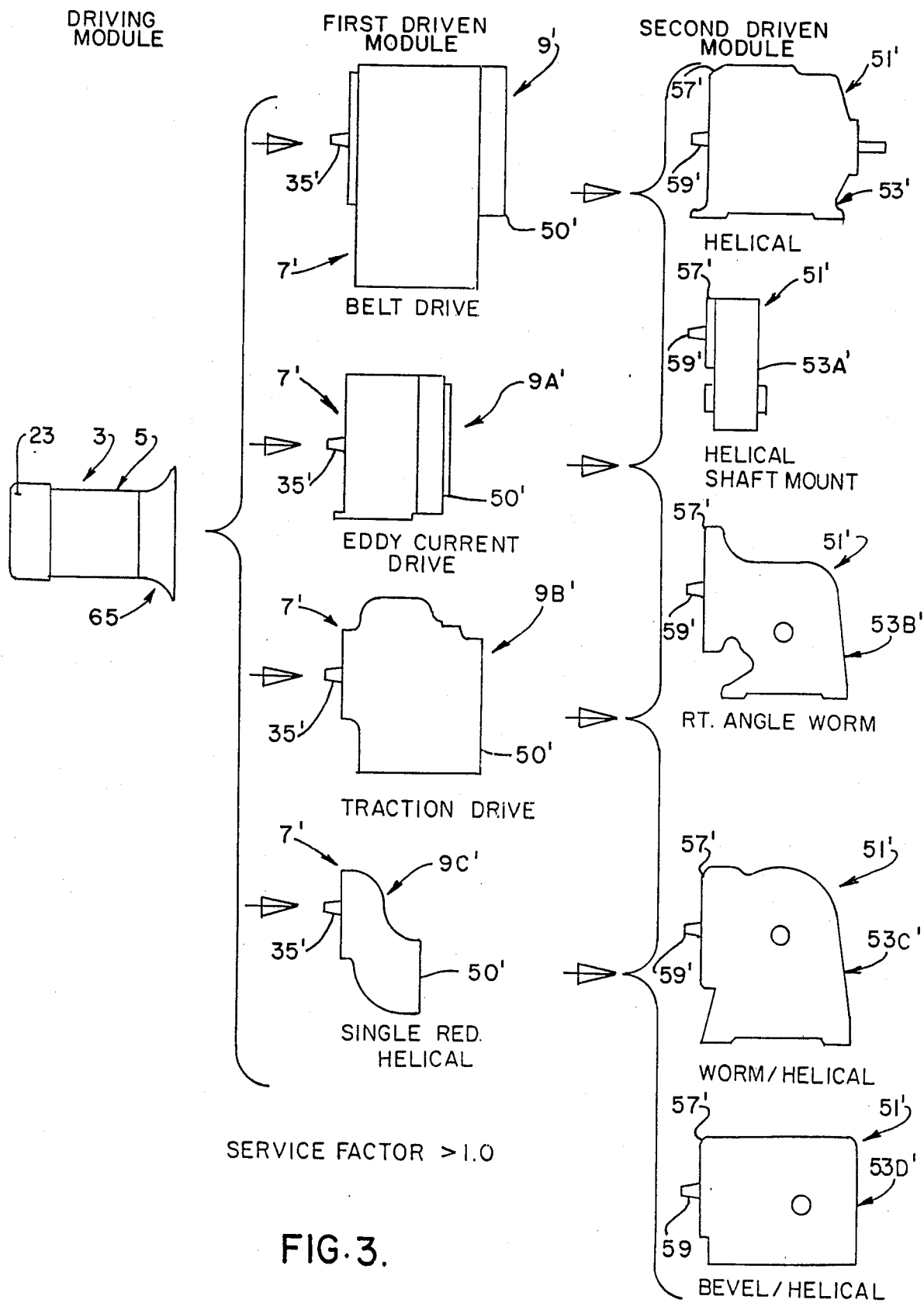
FIG. 3 is a view similar to FIG. 2, showing how various driving modules and driven modules may be coupled together with the service factor between the driving module and the first driven module is greater than 1.0.
Figure 4:
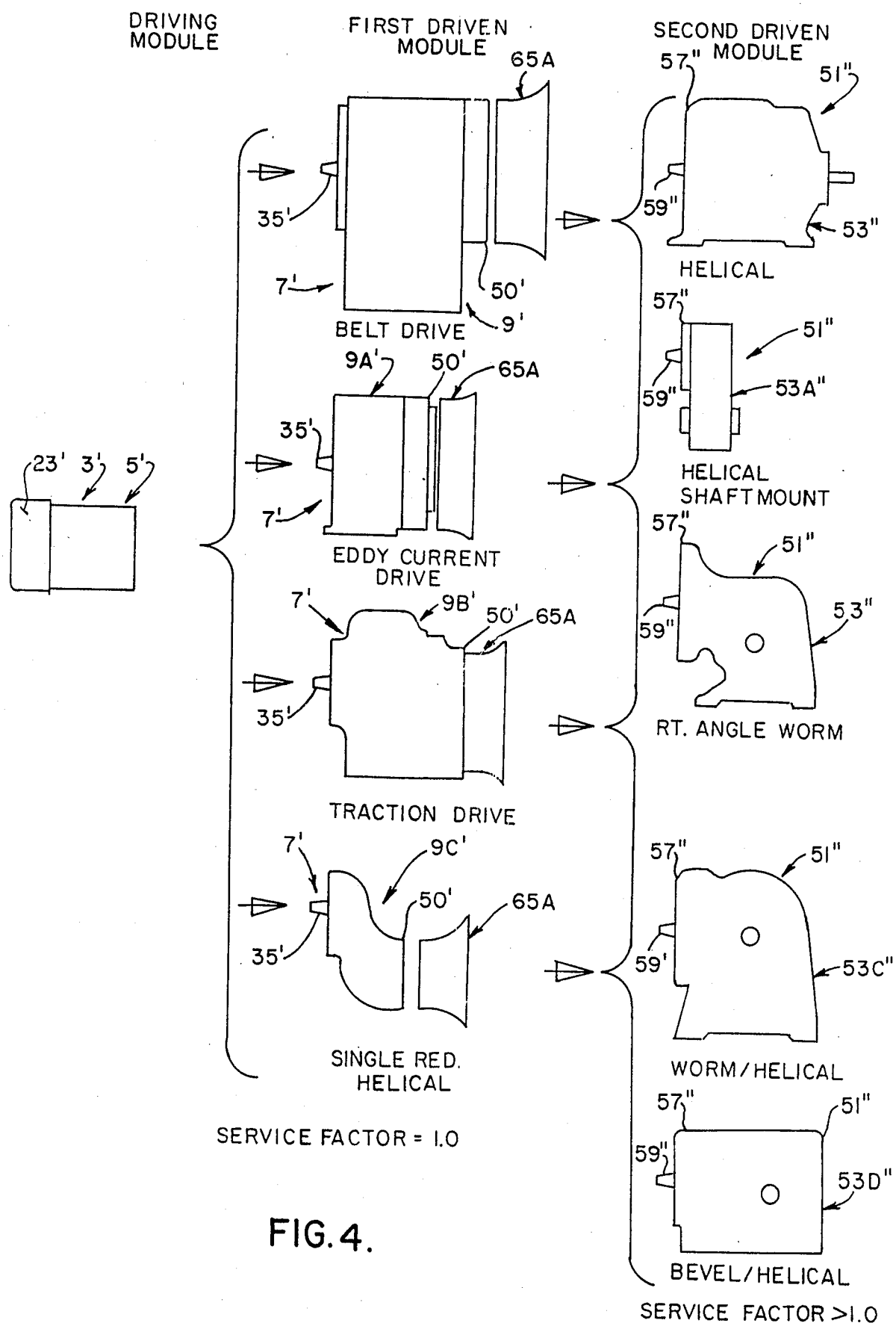
FIG. 4 is a view similar to FIG. 3, illustrating a plurality of applications where the service factor between the first driving module and the first driven module is 1.0, and wherein the service factor between the output of the first driven module and the input of the second module is greater than 1.0.

As indicated generally at 51, a second driven module is adapted to be coupled to output shaft 45 of the first driven module 7. As illustrated in FIGS. 3-4, the second driven modules 51 may include a helical gear speed reducer 53, a helical shaft mount speed reducer 53A, a right angle worm gear speed reducer 53B, a worm/helical gear speed reducer 53C, a bevel/helical gear speed reducer 53D, or any other of a number of other driven modules. Each of these second driven modules 51 has a housing 55 which in turn has a mating surface 57 adapted to engage and to mate with mating surface 50 of the housing 33 of the first driven module 7. For example, the mating surface 57 of housing 55 of the second driven module 51 is adapted to snugly mate with mating surface 50 of belt case 33 of the variable belt drive 9.

Still further, each of the second driven modules 51 has a power input shaft 59 which has a tapered outer surface 61. A threaded opening 63 is provided in the outer end of tapered shaft 59 similar to threaded opening 38 in input shaft 35 of the first driven module 7 for receiving its appropriate draw screw (not shown) inserted axially through bore 49 of output shaft 45 of the first driven module 7. Tapered surface 61 of input shaft 59 is adapted to snugly mate with tapered socket 47 of output shaft 45 of the second driven module in a manner substantially similar to the mating of output shaft 21 of motor 5 and input shaft 35 of the first driven module 7, heretofore described.

It will be appreciated that it is most desirable that the horsepower rating of the first driven module 7 and the second driven module 51 be similar to the horsepower rating of the driving module 3. For example, if the horsepower rating of a driving module 3 is 10 horsepower, then the corresponding horsepower ratings of its respective driven modules 7 and 51 should be 10 horsepower. However, those skilled in the art will recognize that, so long as the horsepower ratings of the driven units 7 or 51 are larger than the modules driving them, such that the driven units will always have sufficient capability to transmit the horsepower applied to their input shafts. Thus, larger driven units can be utilized with smaller driving units.

Herein, the term "service factor" SF is defined as a ratio between the horsepower rating of the driven unit relative to the horsepower rating of its respective driving unit. For example, if the horsepower rating of the first driven module 7 is 10 horsepower, and the horsepower rating of its driving unit 3 is 5 horsepower, then the service factor between driving module 3 and the first driven module 7 will be 2.0. Of course, if the horsepower rating of the driving unit is equal to the horsepower rating of the driven unit, the service factor will be 1. It is necessary that the service factor be equal to or greater than 1 so as to ensure that the driven unit has adequate power transmitting capabilities to transmit the power applied thereto by its respective driving unit.

Power transmitting equipment may be made up of a variety of driving modules, such as a range of different types and sizes of electric motors (i.e., motors of different horsepower ratings, different voltage requirements, different corrosion and atmospheric protection construction features, whether the motor is explosion-proof, totally enclosed fan-cooled motors, and a variety of other factors) mated with any one of a number of driven modules, as illustrated in FIG. 2. Oftentimes, the output shaft 45 of the first driven module 7 may be mated with the input shaft 59 of any one of a number of second driven modules 51, as also illustrated in FIG. 2.

More particularly, referring to FIG. 2, the service factor SF between the first driven module 3 and the second driven module 7 is shown to be equal to 1. Likewise, the service factor between the output of the first driven module 7 and the input of the second driven module 51 is also shown to be equal to 1. In this instance, for example, the horsepower rating of motor 5, the horsepower rating of the first driven module 7, and the horsepower rating of the second driven module 51 are equal.

Those skilled in the art will recognize that it is often desirable to provide a service factor on mechanical power transmission equipment to obtain satisfactory life on applications involving frequent starting, shock loading, and in daily service in excess of ten hours per day operation. Electric motors service factors are typically 1.00 or 1.15, whereas mechanical drives are frequently sized to provide service factors of 1.5 to 2.0 or greater. When oversizing a driven module to provide a give mechanical service factor, it is not customary to oversize the driving module (electric motor) or its overload protection devices.

Thus, in accordance with this invention, it is possible to combine a stock driving module 3 of a given horsepower with a driven module 7 of greater capacity utilizing an adaptor 65 between the driving module and the driven module so long as the service factor of the driven module relative to the driving module is greater than or equal to 1. This permits the number of driving and driven modules carried in stock to be dramatically reduced, thus saving substantial cost, while permitting a full range of combinations of driving modules and driven modules.

More specifically, referring now to FIG. 1, it is seen that if a second driven module 51', having a service factor SF relative to the first driven module 7 greater than 1 may be substituted for a smaller second driven module 51 through the use of an adapter 65. Adapter 65 has a mating surface 57 at one end thereof essentially identical in size and configuration to the mating surface 57 of the smaller second driven module 51 so that the mating surface 57 of adapter 65 securely mates with mating surface 50 of belt case 33 of the first driven module 7 or with mating surface 25 of driving module (electric motor) 5. Suitable fastening means, such as threaded fasteners 62, may be used securing the adapter 65 to cases or frames 55, 55'. Further, adapter 65 has another mating surface 67 adapted to mate with a respective mating surface 69 on the case 55' of the larger second driven module 51'. Additionally, it will be noted that the power input shaft 59' of second driven module 51' has the same outer taper 61' as shaft 59 of second driven module 51, except, in accordance with this invention, input shaft 59' of the second driven module 51' is longer than shaft 59 of driven module 51 such that the outer end of shaft 59' extends out beyond mating surface 57 of adapter 65 essentially the same distance that shaft 59 extends out beyond the mating surface 57 of the case 55 of the second driven module 51. With the taper 61' of shaft 59' being essentially identical to the taper 61 of shaft 59, shaft 59' is socketed within tapered socket 47 of output shaft 45 of the first driven module 7 in the same manner as shaft 59 of second driven module 51.

Further referring to FIG. 1, an even larger horsepower rated second driven module 51'' may be coupled to output shaft 45 of first driven module 7 in place of the second driven modules 51 or 51' by utilizing still another adapter, as indicated generally at 65A. Specifically, adapter 65A has a mating surface 57 on its outer end adapted to be received in and to be securely mated with mating surface 50 of belt case 33 of the first driven module 7. The input shaft 59'' of the larger second driven module 51' has a longer overall length than shaft 59' of driven module 51'. However, shaft 59'' extends out beyond mating surface 57 of adapter 65A substantially the same distance that shaft 59' extend out beyond adapter 65 or that shaft 59 extends out beyond housing 55 of driven module 51. In this manner, power input shaft 59'' of driven module 51' may be socketed in and received by tapered socket 47 of output shaft 45 of the first driven module 7.

In FIG. 3, it is illustrated that, by using an adapter 65 between driving module 3 and the first driven module 7, such that the service factor SF between motor 5 and the first driven module 7 is greater than 1, a first driven module having a horsepower rating greater than the horsepower rating of motor 3 may be utilized. As further illustrated in FIG. 3, the service factor between the first and the second modules 7 and 51, respectively, is equal to 1 such that an adapter is not required between the first and second driven modules.

Referring to FIG. 4, it will be noted that a service factor SF of 1.0 exists between driving module 3 and the first driven modules 7'. It will be understood that primed and double primed reference characters used herein designate corresponding parts having a corresponding function as other parts heretofore described, except the driven modules and driving modules on which the primed and double primed reference characters are used have a higher horsepower rating than the module driving them.

For purposes of clarification, it is assumed that the horsepower rating of motor 5' shown in FIG. 4 is somewhat greater than the horsepower rating of the motor shown in FIGS. 2 and 3. However, in a similar manner, since the service factor SF between motor 5' and the first driven module 7' is equal to 1, no adapter is required. However, it may be desirable to utilize a second driven module 51'' of even a higher horsepower rating than the horsepower rating of the first driven modules 7'. Thus, it will be necessary to use an appropriate adapter 65A between the output side of the first driven module 7' and the input side of the second driven module 51''.

Referring now to FIGS. 5A–5C, it will be understood that, in accordance with this invention, it is possible, through the use of an adapter 65, 65A, to couple the input shaft (35, 35', 35'') of a driven module (7, 7', 7'', respectively) to the output shaft of a driving module (3, 3', or 3''), so long as the horsepower rating of the driven module is equal to or greater than the horsepower rating of the driving module.

More specifically, referring to FIG. 5A, input shaft 35'' is illustrated as being the input shaft of a driven module 7'' having a 10 horsepower rating. Thus, the output shaft 21'' of a 10 horsepower driving module 3'' (e.g., motor 5''), the output shaft 21' of a 5 horsepower driving module 3', or the output shaft 21 of an even smaller 2 horsepower driving module 3 may be coupled to input shaft 35'' of a larger 10 horsepower rated driven module 7''. If a 10 horsepower motor is to be mated to a 10 horsepower driven module, no adapter is required therebetween, and the service factor SF equals 1. If, however, the output shaft 21' of a 5 horsepower driving module 3' is to be coupled with the input shaft 35'' of driven module 7'', then a first adapter 65 (not shown in FIGS. 5A–5C) is necessary between the driving module and the driven module. In this instance, wherein a 5 horsepower driving module 3' is coupled to a 10 horsepower driven module 7'', the service factor is equal to 2. Likewise, if the output shaft 21 of a 2 horsepower driving module 3 is to be coupled to the input shaft 35'' of a 10 horsepower driven module 7'', still another adapter 65A (not shown) must be utilized between the driving module and the driven module. In the last-mentioned instance, the ratio between the horsepower rating of the driven module to the driving module is equal to 5.

Likewise, as shown in FIG. 5B, the power input shaft 35' of another driven module 7' is illustrated such that the horsepower rating of the second driven module 7' is 5 horsepower. In this manner, the output shaft 21' of a 5 horsepower driving module 3' may be coupled to input shaft 35' with a service factor equal to 1. However, in accordance with this invention, the output shaft 21 of a smaller driving module 3 (a 2 horsepower motor) may be coupled to shaft 35' of driven module 7' such that the service factor is greater than 1.

Likewise, as shown in FIG. 5C, input shaft 35 of still a smaller driven module 7 may be directly coupled to output shaft 21 of a driving module 3 having the same horsepower rating as the driven module such that the service factor is equal to 1. In this instance, no adapter is required between the driving and driven modules.

In FIGS. 5A–5C, the 10 horsepower gage line, the 5 horsepower gage line illustrated therein show that if, in FIG. 5A, a 2 horsepower driving module is to be utilized to drive a 10 horsepower driven module, the output shaft 21 of the 2 horsepower driving module 3 engages the tapered outer surface 37'' of input shaft 35' of the 10 horsepower driven module substantially outboard of the location that output shaft 21'' of a 10 horsepower driving module mates with tapered shaft 35'' such that an adapter 65A is required between the 2 horsepower driving module and the 10 horsepower driven module. Likewise, the output shaft 21' of a 5 horsepower driving module engages input shaft 35'' of a 10 horsepower driven module intermediate the point at which the output shaft of a 2 horsepower driving module and the output shaft of a 10 horsepower driving module mates with input shaft 35'' such that another adapter 65 is required between the 5 horsepower driving module and the 10 horsepower driven module.

It will be understood that, in FIGS. 5A–5C, the discussion relating to driven and driving modules having service factors ranging between 1.0 and 5.0 is only exemplary. Within the broader aspects of this invention, the service factor SF between the driven and driving modules may be infinitely varied, so long as the service factor is greater than or equal to 1. However, from a practical standpoint, it may not be desirable or economical to have service factors much in excess of 2.0.

As an example of the present invention's ability to minimize the amount of finished goods inventory required to ship a combination of driven and driving units from stock, it was, heretofore, necessary to stock right angle worm gearmotors in seven different horsepower ranges in 10 different gear reduction ratios. Thus, the total number of prior art gearmotors required to be in stock of a particular horsepower rating and a particular gear ratio was the number of horsepower ratings times the quantity of gear reduction ratios available. In this example, there were seven different horsepower ratings and 10 different speed ratios thus requiring a total of 70 different gearmotors to be in stock.

However, in accordance with the modular driven and driving module concept of the present invention, only seven driving modules and 13 gear modules now need be stocked, such that the total inventory of units required to be in stock may be reduced from 70 to 20.

In another example, it was necessary to stock some 45 different motor ends to drive a variety of driven units, with the motors varying in horsepower rating from fractional horsepower motors through 10 horsepower integral horsepower motors. However, by utilizing the modular concept of the present invention, only 10 motor modules need be stocked, such that the combination of driving modules and driven modules (with appropriate adapters) may be the same.

Through the implementation of the modular driving and driven module concept with appropriate adapters of the present invention, it possible to substantially reduce the amount of inventory required to be in stock such that rapid delivery times of a variety of gear and drive combinations can be met on relatively short notice.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

What is claimed is:

1. A system of combining any one of a plurality of driving modules with any one of a plurality of driven modules, each of said driving modules having an output shaft, each of said driven modules having an input shaft, one of said shafts of said combined driving module and driven module having a tapered outer surface and the other of said shafts having a tapered socket therein with said tapered shaft being coaxially received within said tapered socket with the taper of said outer surface and the taper of said socket being substantially the same, means for locking said shafts together in coaxial coupled relation, said driving and driven modules each having a respective frame, said frames having respective mating surfaces, means for securing said frames together when said output and input shafts are in coaxial coupled alignment, said driving module and said driven module each having a horsepower rating with the horsepower rating of the driven module being greater than or equal to the horsepower rating of said driving module and with a ratio of said driven module horsepower rating to said driving module horsepower rating being referred to as a service factor, said input shaft of said driven unit being sized so as to be coupled to a driving module when the service factor therebetween is greater than or equal to 1, and an adaptor for use when said service factor is greater than 1, said adapter being circumferentially spaced from said input and output shafts and being interposed between the frame mating surfaces of said driving module and said driven module so as to positively space said driven and driving modules axially apart a predetermined distance relative to one another dependent on the predetermined service factor of said driving and driven modules and at the same causing said tapered socket to simultaneously and coaxially receive said tapered shaft at a predetermined axial position therealong such that said socket firmly engages said tapered shaft for the transmission of power therebetween.

2. A system as set forth in claim 1 wherein said output shaft of said driving module has said tapered socket therein, and wherein said input shaft of said driven module has said tapered shaft.

3. A system as set forth in claim 2 wherein said shaft locking means comprises an axial bore with said output shaft of said driving module, a threaded opening in the end of said input shaft of said driven module, and a draw screw extending through said axial bore of said driven module output shaft into thread engagement with said threaded opening in the end of said driven module input shaft thereby to forceably draw said tapered shaft into said socket.

4. A system as set forth in claim 1 wherein the adapter has a different circumferential dimension at the frame mating surface of said driving module than at the frame mating surface of said driven module.

5. A system as set forth in claim 4 where in the adapter includes a curvilinear circumferential surface between the driving module frame mating surface and the driven module frame mating surface.

* * * * *

UNITED STATES PATENT AND TRADEMARK OFFICE
CERTIFICATE OF CORRECTION

PATENT NO. : 4,811,616

DATED : March 14, 1989

INVENTOR(S) : William R. Henderson

It is certified that error appears in the above-identified patent and that said Letters Patent is hereby corrected as shown below:

```
Column 1, line 53 , "a; and" should be --  ; --.
Column 2, line 26, "on" should be -- one --.
Column 2, line 38, "comb:,nation" should be -- combination --.
Column 2, line 59, "are" should be -- is --.
Column 2, line 63, "are" should be -- is --.
Column 3, line 26, "where factor" should be -- where the
 service factor --.
Column 7, line 30, "51'"should be -- 51" --.
Column 10, line 29, after "same" insert -- time --.
```

Signed and Sealed this

Twenty-ninth Day of June, 1993

Attest:

MICHAEL K. KIRK

*Attesting Officer*    *Acting Commissioner of Patents and Trademarks*